US011375350B2

(12) United States Patent
Basu Mallick et al.

(10) Patent No.: US 11,375,350 B2
(45) Date of Patent: Jun. 28, 2022

(54) MULTIPLE ZONE CONFIGURATION

(71) Applicant: Lenovo (Singapore) PTE. LTD., New Tech Park (SG)

(72) Inventors: Prateek Basu Mallick, Dreieich (DE); Karthikeyan Ganesan, Kaiserslautern (DE); Joachim Loehr, Wiesbaden (DE); Ravi Kuchibhotla, Chicago, IL (US); Alexander Johann Maria Golitschek Edler von Elbwart, Darmstadt (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 19 days.

(21) Appl. No.: 16/851,483

(22) Filed: Apr. 17, 2020

(65) Prior Publication Data

US 2020/0336872 A1 Oct. 22, 2020

Related U.S. Application Data

(60) Provisional application No. 62/835,847, filed on Apr. 18, 2019.

(51) Int. Cl.
*H04W 4/00* (2018.01)
*H04W 4/40* (2018.01)
*H04W 4/029* (2018.01)
*H04W 4/02* (2018.01)
*H04W 72/04* (2009.01)

(52) U.S. Cl.
CPC ............ *H04W 4/40* (2018.02); *H04W 4/023* (2013.01); *H04W 4/029* (2018.02); *H04W 72/0406* (2013.01)

(58) Field of Classification Search
CPC ....... H04W 4/40; H04W 4/029; H04W 4/023; H04W 72/0406
See application file for complete search history.

(56) References Cited

U.S. PATENT DOCUMENTS

2019/0068312 A1* 2/2019 Zhang .................. H04L 1/0033
2019/0174503 A1* 6/2019 Adachi ............... H04W 72/121
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, pp. 1-933.
(Continued)

*Primary Examiner* — Erika A Washington
(74) *Attorney, Agent, or Firm* — Kunzler Bean & Adamson

(57) ABSTRACT

Apparatuses, methods, and systems are disclosed for multiple zone configuration. One method includes configuring a first device with first information indicating a first zone configuration comprising a first plurality of zones. The method includes configuring the first device with second information indicating a second zone configuration comprising a second plurality of zones, wherein: a first area corresponding to zones of the first plurality of zones is smaller than a second area corresponding to zones of the second plurality of zones; and the first plurality of zones corresponds to a same geographical area as the second plurality of zones.

13 Claims, 7 Drawing Sheets

(56) References Cited

U.S. PATENT DOCUMENTS

| | | | |
|---|---|---|---|
| 2019/0335532 A1* | 10/2019 | Kim | H04W 12/06 |
| 2020/0100048 A1* | 3/2020 | Wu | H04L 5/0055 |
| 2020/0100306 A1* | 3/2020 | Ayaz | H04W 88/04 |
| 2020/0107236 A1* | 4/2020 | Tseng | H04W 76/27 |

OTHER PUBLICATIONS

PCT/IB2020/000280, "Notification of Transmittal of the International Search Report and the Written Opinion of the International Searching Authority, or the Declaration", ISA, dated Oct. 8, 2020, pp. 1-28.

Sequans Communications, On HARQ procedure for NR sidelink, 3GPP TSG RAN WG1 Meeting #96bis R1-1905388, Apr. 8-12, 2019, pp. 1-4.

Catt, Discussion on QoS management for sidelink in NR V2X, 3GPP TSG RAN WG1 Meeting #96bis R1-1905357, Apr. 8-12, 2019, pp. 1-4.

Mediatek Inc., Discussion on physical layer procedure, 3GPP TSG RAN WG1 #96 R1-1901810, Feb. 25-Mar. 1, 2019, pp. 1-9.

Huawei, Hisilicon, Sidelink physical layer procedures for NR V2X, 3GPP TSG RAN WG1 Meeting #96 R1-1901537, Feb. 25-Mar. 1, 2019, pp. 1-16.

Interdigital, Inc., Discussion on Range Requirement and CBR/CR in NR V2X, 3GPP TSG RAN WG1 Ad-hoc Meeting 1901 R1-1900770, Jan. 21-25, 2019, pp. 1-5.

PCT/IB2020/000280, "Invitation to Pay Additional Fees and, Where Applicable, Protest Fee", PCT ISA, dated Aug. 10, 2020, pp. 1-23.

Interdigital, Inc. "Discussion on Range Requirement and CBR/CR in NR V2X", 3GPP TSG RAN WG1 Ad-hoc Meeting 1901 R1-190070, Jan. 21-25, 2019, pp. 1-5.

Catt, "Discussion on QoS management for sidelink in NR V2X", 3GPP TSG RAN WG1 Meeting #96bis R1-1905357, Apr. 3-12, 2019, pp. 1-4.

* cited by examiner

FIG. 4

MULTIPLE ZONE CONFIGURATION

CROSS-REFERENCE TO RELATED APPLICATIONS

This application claims priority to U.S. Patent Application Ser. No. 62/835,847 entitled "APPARATUSES, METHODS, AND SYSTEMS FOR RESOURCE ALLOCATION USING OVERLAPPING ZONE CONFIGURATIONS" and filed on Apr. 18, 2019 for Prateek Basu Mallick, which is incorporated herein by reference in its entirety.

FIELD

The subject matter disclosed herein relates generally to wireless communications and more particularly relates to multiple zone configuration.

BACKGROUND

The following abbreviations are herewith defined, at least some of which are referred to within the following description: Third Generation Partnership Project ("3GPP"), 5$^{th}$ Generation ("5G"), QoS for NR V2X Communication ("5QI/PQI"), Authentication, Authorization, and Accounting ("AAA"), Positive-Acknowledgment ("ACK"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Authentication Server Function ("AUSF"), Authentication Token ("AUTN"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Universal Geographical Area Description ("GAD"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TM"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, geographical zones may be used.

BRIEF SUMMARY

Methods for multiple zone configuration are disclosed. Apparatuses and systems also perform the functions of the methods. One embodiment of a method includes configuring a first device with first information indicating a first zone configuration comprising a first plurality of zones. In some embodiments, the method includes configuring the first device with second information indicating a second zone configuration comprising a second plurality of zones, wherein: a first area corresponding to zones of the first plurality of zones is smaller than a second area corresponding to zones of the second plurality of zones; and the first plurality of zones corresponds to a same geographical area as the second plurality of zones.

One apparatus for multiple zone configuration includes a processor that: configures a first device with first information indicating a first zone configuration comprising a first plurality of zones; and configures the first device with second information indicating a second zone configuration comprising a second plurality of zones, wherein: a first area corresponding to zones of the first plurality of zones is smaller than a second area corresponding to zones of the second plurality of zones; and the first plurality of zones corresponds to a same geographical area as the second plurality of zones.

Another embodiment of a method for multiple zone configuration includes configuring a first device with first information indicating a first zone configuration comprising a first plurality of zones. In some embodiments, the method includes configuring the first device with second information indicating at least one resource pool and a range of quality of service identifiers corresponding to each resource pool of the at least one resource pool.

Another apparatus for multiple zone configuration includes a processor that: configures a first device with first information indicating a first zone configuration comprising a first plurality of zones; and configures the first device with second information indicating at least one resource pool and a range of quality of service identifiers corresponding to each resource pool of the at least one resource pool.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of a multiple zone configuration;

DETAILED DESCRIPTION

Figure 1:
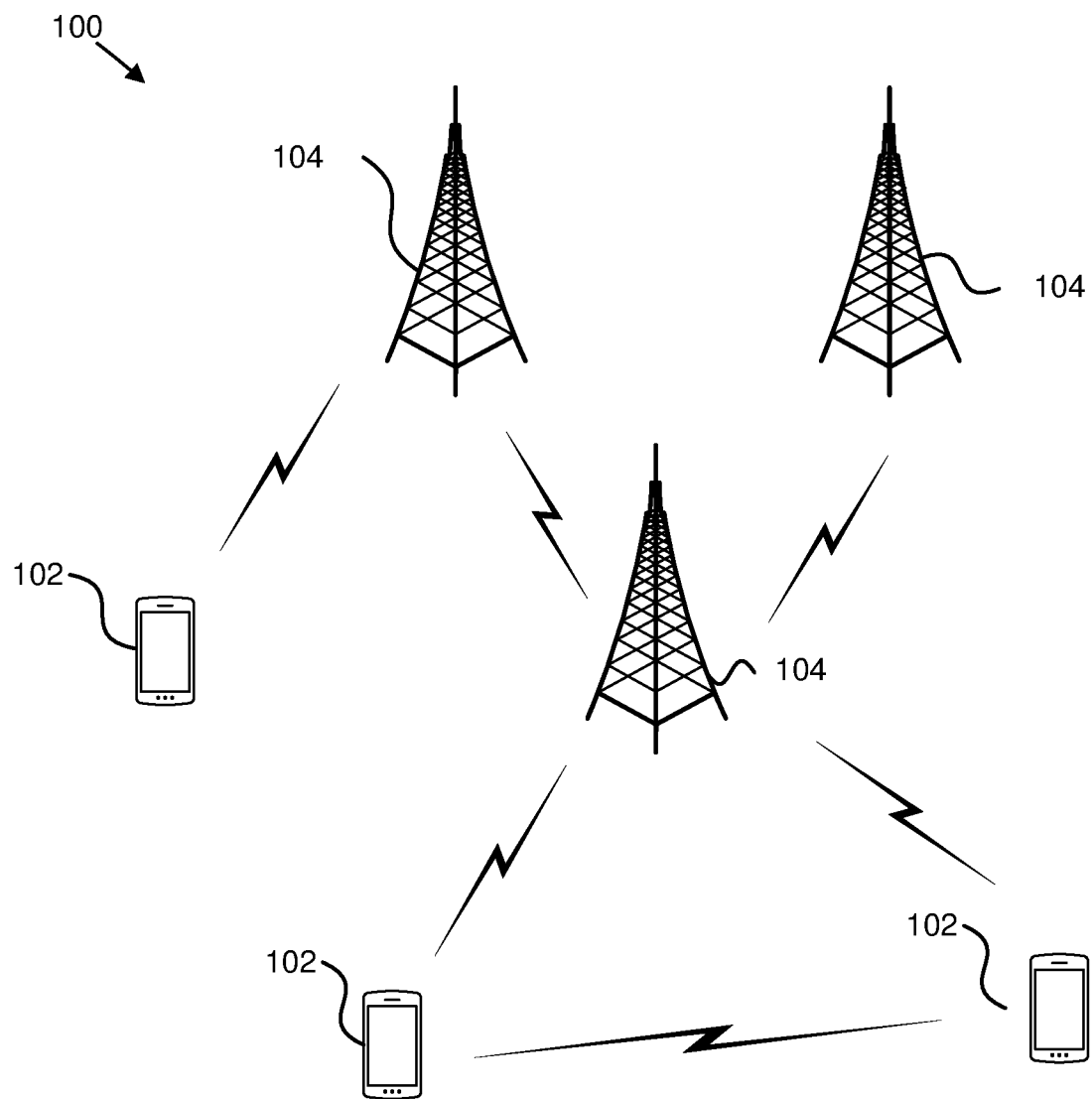
FIG. 1 is a schematic block diagram illustrating one embodiment of a wireless communication system for multiple zone configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for multiple zone configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may configure a first device with first information indicating a first zone configuration comprising a first plurality of zones. In some embodiments, the remote unit 102 may configure the first device with second information indicating a second zone configuration comprising a second plurality of zones, wherein: a first area corresponding to zones of the first plurality of zones is smaller than a second area corresponding to zones of the second plurality of zones; and the first plurality of zones corresponds to a same geographical area as the second plurality of zones. Accordingly, the remote unit 102 may be used for multiple zone configuration.

In some embodiments, a remote unit 102 may configure a first device with first information indicating a first zone configuration comprising a first plurality of zones. In some embodiments, the remote unit 102 may configure the first device with second information indicating at least one resource pool and a range of quality of service identifiers corresponding to each resource pool of the at least one resource pool. Accordingly, the remote unit 102 may be used for multiple zone configuration.

Figure 2:
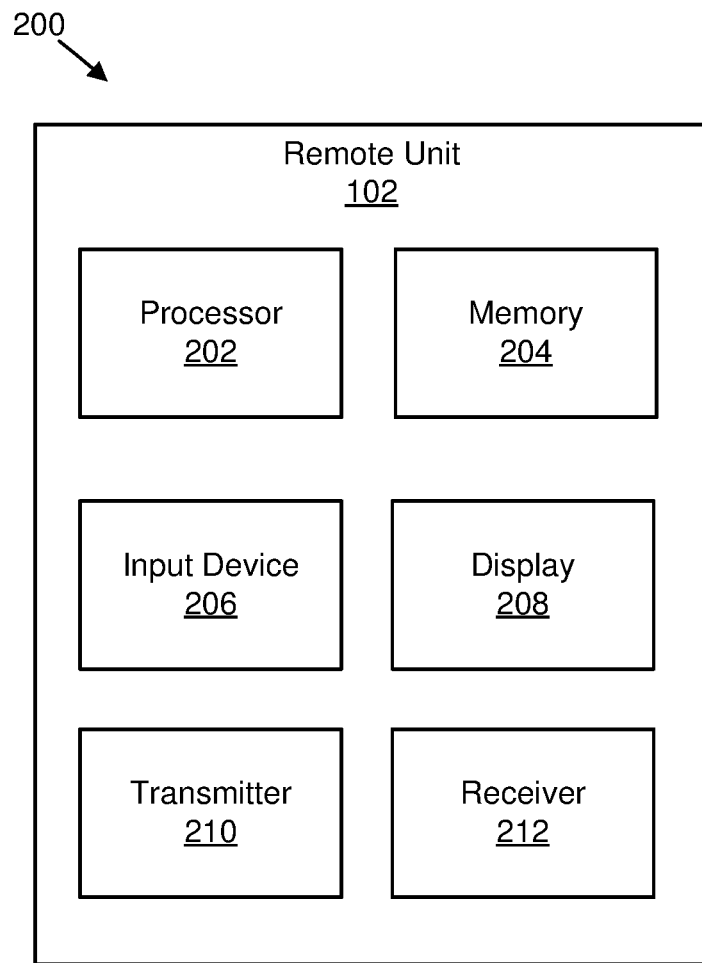
FIG. 2 is a schematic block diagram illustrating one embodiment of an apparatus that may be used for multiple zone configuration.

FIG. 2 depicts one embodiment of an apparatus 200 that may be used for multiple zone configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may: configure a first device with first information indicating a first zone configuration comprising a first plurality of zones; and configure the first device with second information indicating a second zone configuration comprising a second plurality of zones, wherein: a first area corresponding to zones of the first plurality of zones is smaller than a second area corresponding to zones of the second plurality of zones; and the first plurality of zones corresponds to a same geographical area as the second plurality of zones. In various embodiments, the processor 202 may: configure a first device with first information indicating a first zone configuration comprising a first plurality of zones; and configure the first device with second information indicating at least one resource pool and a range of quality of service identifiers corresponding to each resource pool of the at least one resource pool. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
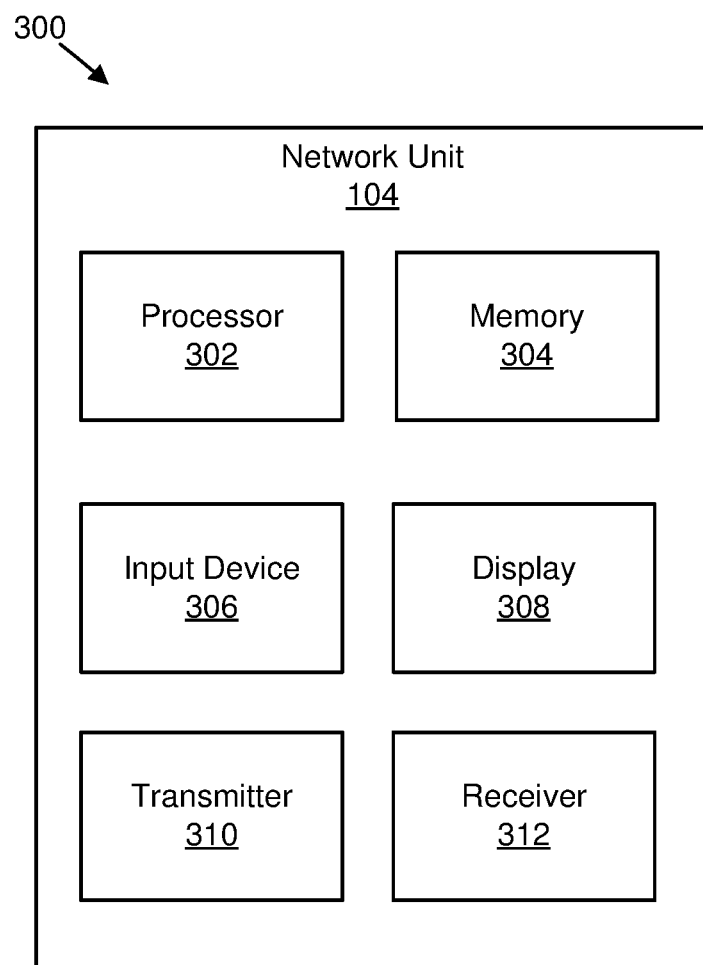
FIG. 3 is a schematic block diagram illustrating one embodiment of an apparatus that may be used for multiple zone configuration.

FIG. 3 depicts one embodiment of an apparatus 300 that may be used for multiple zone configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit information indicating zone configurations.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, two resource allocation modes may be used for NR and LTE V2X communications. In such embodiments, the two resource allocation modes for LTE may be referred to as Mode 3 and Mode 4; and for NR may be referred as Mode 1 and Mode 2. These different modes support direct V2X communications but differ on how they allocate radio resources. In certain modes, the cellular network allocates resources (e.g., a gNB allocates Mode-1 resources and an eNB allocates Mode-3 resources). In various modes (e.g., Mode-2 and Mode-4), cellular coverage is not required, and vehicles autonomously select their radio resources using a distributed scheduling scheme supported by congestion control mechanisms from pre-configured resource pools. In some embodiments, a RAN for in-coverage may can also allocate Mode-2 and Mode-4 resources. In certain embodiments, Mode-2 and/or Mode 4 are considered baseline modes and represents an alternative to 802.11p or DSRC.

In various embodiments, such as for Mode 4 based resource allocation in LTE, a zone concept may be used. In the zone concept, the Earth is divided in rectangular boxes called zones. In such embodiments, each eNB may configure a size of the zones. Furthermore, each eNB may configure a number of SL communication resource pools for V2X and may indicate a zone ID for which a UE may use a resource pool. As may be appreciated, a zone concept may be used for NR based V2X communication.

In certain embodiments, zones are only used for resource pool allocation. In some embodiments, zones may be used to calculate a distance between a transmitter UE and a receiver UE. Based on this calculated distance the receiver UE may send HARQ feedback for a transmission made by the transmitter UE. In various embodiments, a receiver UE may only send HARQ feedback for a transmission made by a transmitter UE if a distance between the receiver UE and the transmitter UE is lower than a certain MCR. In some embodiments, a transmitter UE may announce its zone (e.g., in SCI) and a receiver UE (having determined its own zone) may calculate a distance from the transmitter UE.

In various embodiments, to minimize inaccuracies in a distance calculation, zones may be as small as possible. However, as may be appreciated, a small zone may lead to frequent zone changes by a moving transmitter UE and may need to use a different TX pool corresponding to a new zone. In some embodiments, a sensing operation may be performed before a transmitter UE can transmit. In such embodiments, the transmitter UE may not have enough time to finish the sensing operation before it moves to a next zone, or a remaining amount of useful time may be minimal. These situations may lead to unacceptable V2X performance as transmissions are interrupted often due to frequent zone changes.

In certain embodiments, a zone size is large (e.g., in the order of 100s of meters) to avoid frequent zone changes. However, a distance calculated between a transmitter UE and a receiver UE with a large zone size may be inaccurate.

In various embodiments, a SL-ZoneConfig IE may indicate zone configurations used for V2X sidelink communication, such as the IE shown in Table 1 having field descriptions shown in Table 2.

TABLE 2

SL-ZoneConfig Field Descriptions

| Field | Description |
| --- | --- |
| zonelength | Indicates the length of each geographic zone. Value m5 corresponds to 5 meters, m10 corresponds to 10 meters and so on. |
| zonewidth | Indicates the width of each geographic zone. Value m5 corresponds to 5 meters, m10 corresponds to 10 meters and so on. |
| zoneidlongimod | Indicates the total number of zones that is configured with respect to longitude. |
| zoneidlatimod | Indicates the total number of zones that is configured with respect to latitude. |

In some embodiments, a UE may determine an identity of the zone (e.g., Zone_id) in which it is located using the following formula, if zoneConfig is included in SystemInformationBlockType21, SystemInformationBlockType26, in SL-V2X-Preconfiguration: x1=Floor (x/L) Mod Nx; y1=Floor (y/W) Mod Ny; Zone_id=y1*Nx+x1.

The parameters in the formula are defined as follows: L is the value of zoneLength included in zoneConfig in SystemInformationBlockType21, SystemInformationBlockType26, or in SL-V2X-Preconfiguration; W is the value of zoneWidth included in zoneConfig in SystemInformationBlockType21, SystemInformationBlockType26, or in SL-V2X-Preconfiguration; Nx is the value of zoneIdLongiMod included in zoneConfig in SystemInformationBlockType21, SystemInformationBlockType26, or in SL-V2X-Preconfiguration; Ny is the value of zoneIdLatiMod included in zoneConfig in SystemInformationBlockType21, SystemInformationBlockType26, or in SL-V2X-Preconfiguration; x is the geodesic distance in longitude between UE's current location and geographical coordinates (0, 0) according to WGS84 model [80] and it is expressed in meters; y is the geodesic distance in latitude between UE's current location and geographical coordinates (0, 0) according to WGS84 model [80] and it is expressed in meters.

In various embodiments, an eNB configures a number of SL communication resource pools for V2X and indicates a zone ID for which a UE may use a resource pool.

Figure 4:
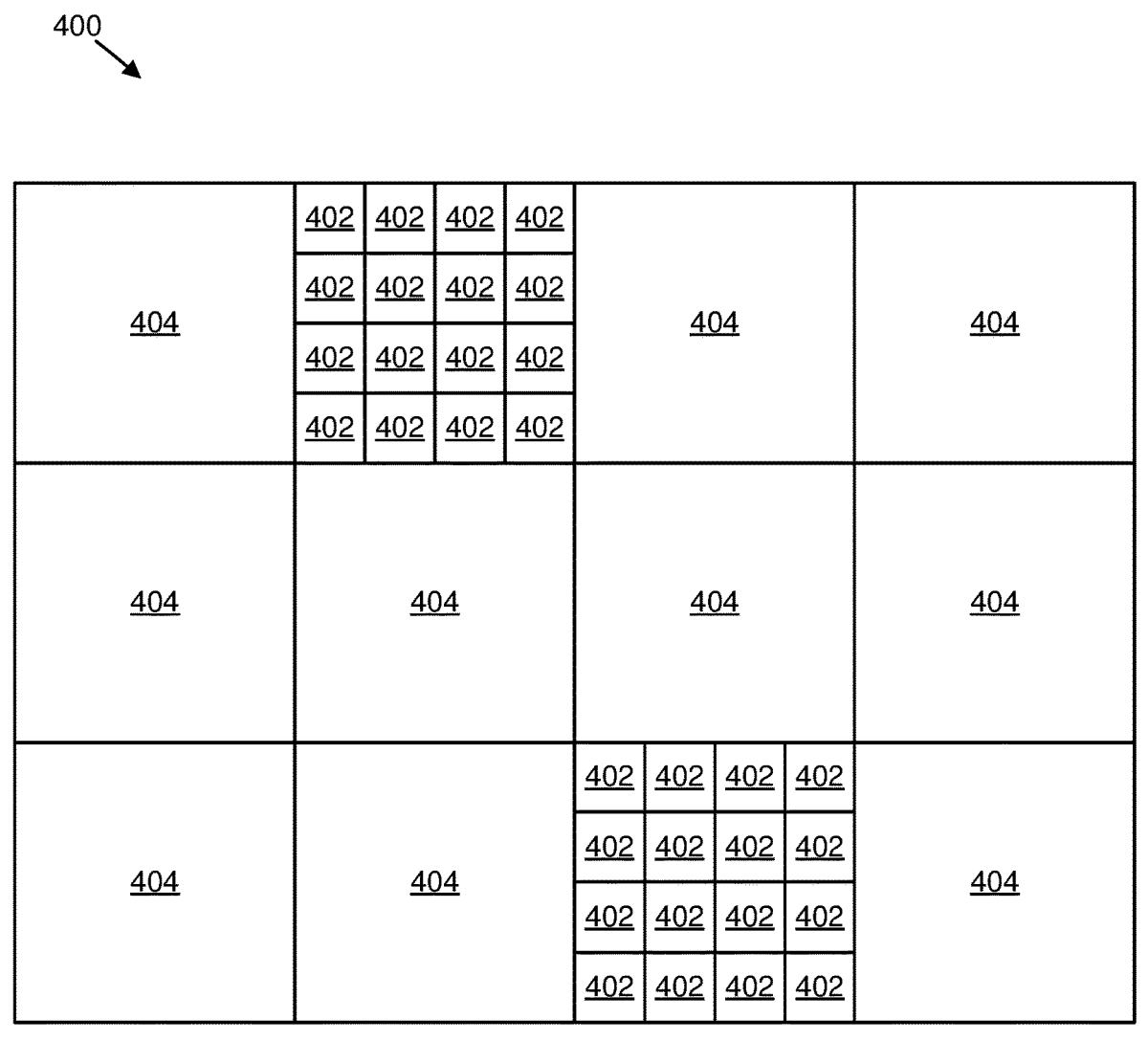

FIG. 4 is a schematic block diagram illustrating one embodiment of a multiple zone configuration 400. The multiple zone configuration 400 includes a first zone configuration having first zones 402 and a second zone configuration having second zones 404. As may be appreciated, the first zones 402 overlap with the second zones 404. While the first zones 402 are illustrated in only certain areas, it may be understood that the first zones 402 also exist within the illustrated second zones 404. Furthermore, while the second zones 404 are illustrated in only certain areas, it may be understood that the second zones 404 also encompass the first zones 402 illustrated.

The first zone configuration may be used to find a distance between two UEs. Thus, the first zones 402 of the first

TABLE 1

SL-ZoneConfig Informational Element

```
-- ASN1START
SL-ZoneConfig-r14 ::=      SEQUENCE {
    zoneLength-r14         ENUMERATED { m5, m10, m20, m50, m100, m200, m500, spare1},
    zoneWidth-r14          ENUMERATED { m5, m10, m20, m50, m100, m200, m500, spare1},
    zoneIdLongiMod-r14     INTEGER (1..4),
    zoneIdLatiMod-r14      INTEGER (1..4)
}
-- ASN1STOP
``` configurations may be small in size (e.g., 5 m or smaller, smaller than the second zones 404), width, and/or length. By the first zones 402 having a small size, inaccuracies of a distance calculation between two UEs may be reduced. In some embodiments, the first configuration of the first zones 402 may be used to determine a TX-RX distance and/or to configure SL HARQ feedback to enhance reliability of a data transmission. In such embodiments, the data transmission includes different cast types (e.g., broadcast, groupcast, and/or unicast) in the same or the different resource pools. The data transmission may be different based on a cast type used.

The second zone configuration may be used to allocate resources for V2X communication to UEs. Thus, the second zones 404 of the second configurations may be large in size (e.g., 50 m, 100 m, or larger), width, and/or length. By the second zones 404 having a large size, zone changes for moving UEs may be reduced. For example, if a set of resources (e.g., a resource pool) is assigned to a zone of the second zones 404, the zone (e.g., having a large size) may avoid frequent resource pool changes. The second zones 404 having a large size may also be beneficial if a transmitting UE performs sensing before it may begin transmitting. In certain embodiments, the second zone configuration may enable a UE to transmit V2X messages without first performing a sensing operation. The ability for a UE to transmit V2X messages without first performing a sensing operation may be configurable. In various embodiments, if a sensing operation is configured to be performed, a UE may randomly select resources until a result of the sensing operation is available.

In some embodiments, the first zone configuration may be specified and/or pre-provisioned per geographical region (e.g., so that air interface signaling is not needed), or the first zone configuration may be configured by a gNB using RRC signaling. In certain embodiments, the second zone configuration may be configured by a gNB using RRC (e.g., broadcast or dedicated) signaling. In various embodiments, a gNB may signal the first zone configuration and the second zone configuration (e.g., using RRC signaling). As may be appreciated, RAN validity area signaling optimizations may be used for signaling the first zone configuration and/or the second zone configuration.

As may be appreciated, the first zones 402 and the second zones 404 do not need to be rectangular or geographically based on latitudes and longitude. In some embodiments, the second zone configuration of the second zones 404 may be based on traveling directions and/or speeds of vehicles, and/or the resource pool configurations may be based on MCR. Furthermore, any combination of geography, direction, and/or speed for the first zone configuration and/or the second zone configuration may be used.

In various embodiments, there may be layers of second zone configurations. For example, a first layer of second zone configurations may have second zones 404 having a length and a width of 50 m, a second layer of second zone configurations may have second zones 404 having a length and a width of 100 m, a third layer of second zone configurations may have second zones 404 having a length and a width of 200 m, and so forth. Each of the layers may overlap with one another. In such embodiments, a UE may select a layer of the second zone configuration based on a speed or speed range (e.g., for a higher speed a larger second zone 404 may be selected).

In certain embodiments, a distance between a TX UE and an RX UE may be calculated. As may be appreciated, zones may have any suitable shape, such as a rectangular shape (e.g., as illustrated in FIG. 4), a hexagonal shape, an octagonal shape, a circular shape, and so forth. If the zones have a circular shape, a non-covered area between circles may be covered with its own separate preconfigured resource pool.

To calculate the distance between a TX UE and an RX UE, a geometric center of a shape of a zone may be used (e.g., the distance is calculated between a center of a zone of the TX UE to a center of a zone of the RX UE). For rectangular shaped zones, the center of a zone may be an intersection point of the diagonals of the rectangle. For circular shaped zones, the center of a zone may be the center of the circle. In some embodiments, a geometric center may be used irrespective of an actual location of a UE in its zone (e.g., irrespective of where the UE is located within the zone). In certain embodiments, a transmitter UE indicates its zone ID in SCI and a receiver UE may determine which Zone ID it is in and then may calculate a distance from the transmitter UE to the receiver UE in one of the following methods: 1) squareroot of [square of ((the number of zones along a prime meridian between the two zone IDs+1)*zone length)+square of ((the number of zones along a latitude or equator between the two zone IDs+1)*zone width); or 2) determine an exact geographical position (e.g., longitude, latitude) of the centers of the two concerned zone IDs and then calculate the distance on Earth between these two points. In these two methods, both zone IDs of the transmitter UE (e.g., a first zone ID corresponding to the first configuration, and a second zone ID corresponding to the second configuration) may be used to determine whether the zone corresponding to the first zone ID is within the zone corresponding to the second zone ID. Therefore, in some embodiments, the transmitter signals both zone IDs to the receiver UE using SCI.

In various embodiments, apart from a zone ID corresponding to a transmitter UE, a receiver UE may also need to know an MCR corresponding to the transmitter UE to determine whether the receiver UE needs to provide HARQ feedback to the transmitter UE. The MCR may be determined in the receiver UE using one or more of the following methods: 1) MCR may be associated with a group destination ID (e.g., thus no air interface signaling is required because the receiver UE, based on the group destination ID of the received packet, would know the MCR); 2) MCR may have limited possible values (e.g., 50 m, 100 m, 200 m, 400 m, 500 m, 1000 m) and a mapping table may include MCR values corresponding to an index (SCI signaling may be used to transmit the index to select the MCR); and/or 3) upper layers may signal the MCR to each UE (a receiver UE may determine the MCR upon receiving a packet based on an associated PQI signaled with this packet in SCI or in PC5 RRC—no air interface signaling is required for this).

Figure 5:
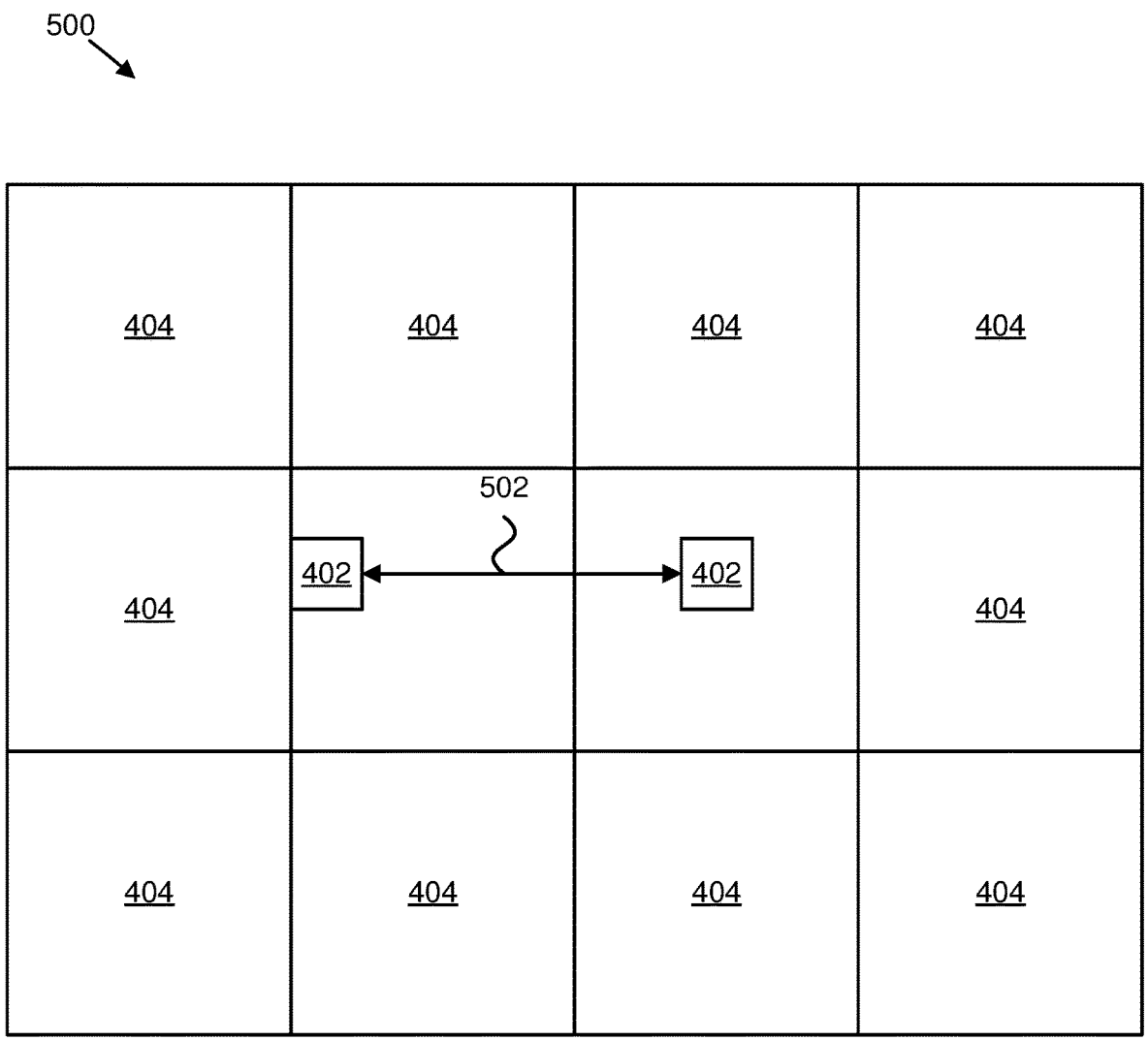
FIG. 5 is a schematic block diagram illustrating one embodiment of a distance calculation.

FIG. 5 is a schematic block diagram illustrating one embodiment of a distance calculation 500. As described herein, a distance 502 between a first UE in a zone 402 having a first zone ID and a second UE in a zone 402 having a second zone ID may be calculated.

In some embodiments, only zone configurations having first zone configurations are configured. The first zone configurations are only used for distance calculation between an RX UE and a TX UE. For resource allocation purposes, one or more resource pools may be defined. Each resource pool of the one or more resource pools may be associated with a range (or list) of PQIs. If a V2X message (e.g., packet) to be transmitted on a certain frequency and/or carrier has a PQI of 'x', then the UE is enabled to choose only a resource pool that has 'x' as one of its associated PQIs. If there are more than one such resource pools, then the UE may select one of them randomly.

In various embodiments, for the second Zone configurations, there may be dedicated resource pools for sending HARQ feedback by a receiver UEs upon receiving SL data from a transmitter UE. In such embodiments, a transmitter UE may reserve certain resources commensurate with a number of UEs in a group for obtaining feedback for its transmissions from all these member UEs. Information containing a number of UEs in a group may be indicated by an upper layer to an AS. In some embodiments, only UEs that are inside of an MCR may be counted as a current number of UEs in a group. In certain embodiments, an upper layer sends a number of UEs in a group to an AS if there is a change in the number. In various embodiments, to reserve required feedback resources, a transmitter may perform sensing and reservation as if it would be transmitting on these reserved feedback resources (e.g., an SCI indication for reservation may be the same and/or similar to the SCI indication used for reservation of SL data resources).

In some embodiments, a gNB creates one or more special locations inside gNB coverage. In such one or more special locations, a different zone configuration or resource allocation may apply (e.g., different from the first zone configuration and/or the second zone configuration). The one or more special location coordinates may be broadcasted by a gNB and also corresponding RA and/or zone configurations to be applied by the UEs. In certain embodiments, one or more special locations may be implemented via an area specific V2X-SIB message delivery in which the area specific V2X-SIB is configured independently based on certain geographical location that includes special locations. Validity of the V2X-SIBs may be related to zone IDs. In various embodiments, if a V2X UE enters a new zone based on its own location, it acquires a new V2X-SIB message.

In some embodiments, a special zone may be based on time dependent and/or traffic density and the configuration for the special zone may be configured and reconfigured with a V2X SIB UE.

Figure 6:
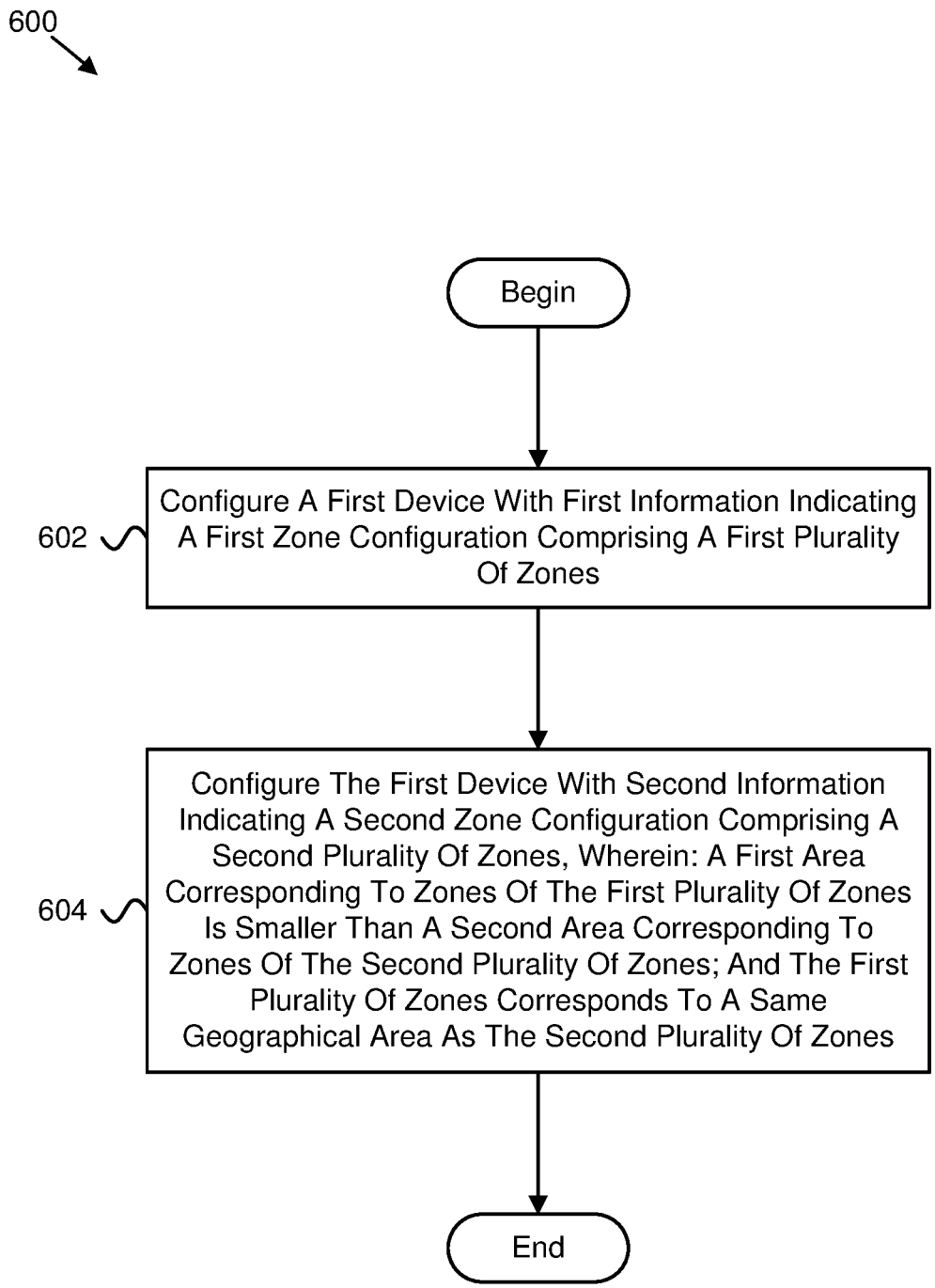
FIG. 6 is a flow chart diagram illustrating one embodiment of a method for multiple zone configuration.

FIG. 6 is a flow chart diagram illustrating one embodiment of a method 600 for multiple zone configuration. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes configuring 602 a first device with first information indicating a first zone configuration comprising a first plurality of zones. In some embodiments, the method 600 includes configuring 604 the first device with second information indicating a second zone configuration comprising a second plurality of zones, wherein: a first area corresponding to zones of the first plurality of zones is smaller than a second area corresponding to zones of the second plurality of zones; and the first plurality of zones corresponds to a same geographical area as the second plurality of zones.

In certain embodiments, the first zone configuration is used to determine a distance between the first device and a second device. In some embodiments, the first zone configuration is used to configure sidelink feedback. In various embodiments, the second zone configuration is used to allocate resources for vehicle-to-everything communication.

In one embodiment, each zone of the second plurality of zones is assigned a set of resources. In certain embodiments, the method 600 further comprises receiving third information indicating whether a vehicle-to-everything communication corresponding to a zone of the second plurality of zones is enabled without performing a sensing operation. In some embodiments, the method 600 further comprises receiving the first information using radio resource control signaling.

In various embodiments, the method 600 further comprises receiving the second information using radio resource control signaling. In one embodiment, the second area corresponding to zones of the second plurality of zones corresponds to a speed related to the first device. In certain embodiments, zones of the first plurality of zones are square shaped, rectangular shaped, hexagonally shaped, octagonally shaped, or circular.

In some embodiments, the method 600 further comprises determining a distance between the first device and a second device based on a geometric center of a zone of the first plurality of zones corresponding to the second device and a geographical position of the first device. In various embodiments, the method 600 further comprises receiving a zone identifier corresponding to a second device in sidelink control information. In one embodiment, the method 600 further comprises determining a distance between the first device and the second device using the zone identifier.

In certain embodiments, the method 600 further comprises determining a distance between the first device and a second device based on geographical location corresponding to the first device and the second device. In some embodiments, the method 600 further comprises determining a minimum communication range corresponding to a second device. In various embodiments, the minimum communication range is determined based on an association between the minimum communication range and a group destination identifier corresponding to a received data packet.

In one embodiment, the minimum communication range is determined based on a received index value, and a mapping table comprises a mapping between a plurality of index values comprising the received index value and a plurality of minimum communication ranges comprising the minimum communication range. In certain embodiments, the method 600 further comprises receiving an indication of the minimum communication range in upper layer signaling. In some embodiments, the second zone configuration comprises information indicating dedicated resource pools for sending feedback.

In various embodiments, the method 600 further comprises reserving feedback resources based on a number of devices in a device group. In one embodiment, reserving the feedback resources comprises performing a sensing procedure and reserving the feedback resources for group member devices determined from the sensing procedure. In certain embodiments, the second information indicates specific geographic locations having a configuration different from the second zone configuration.

Figure 7:
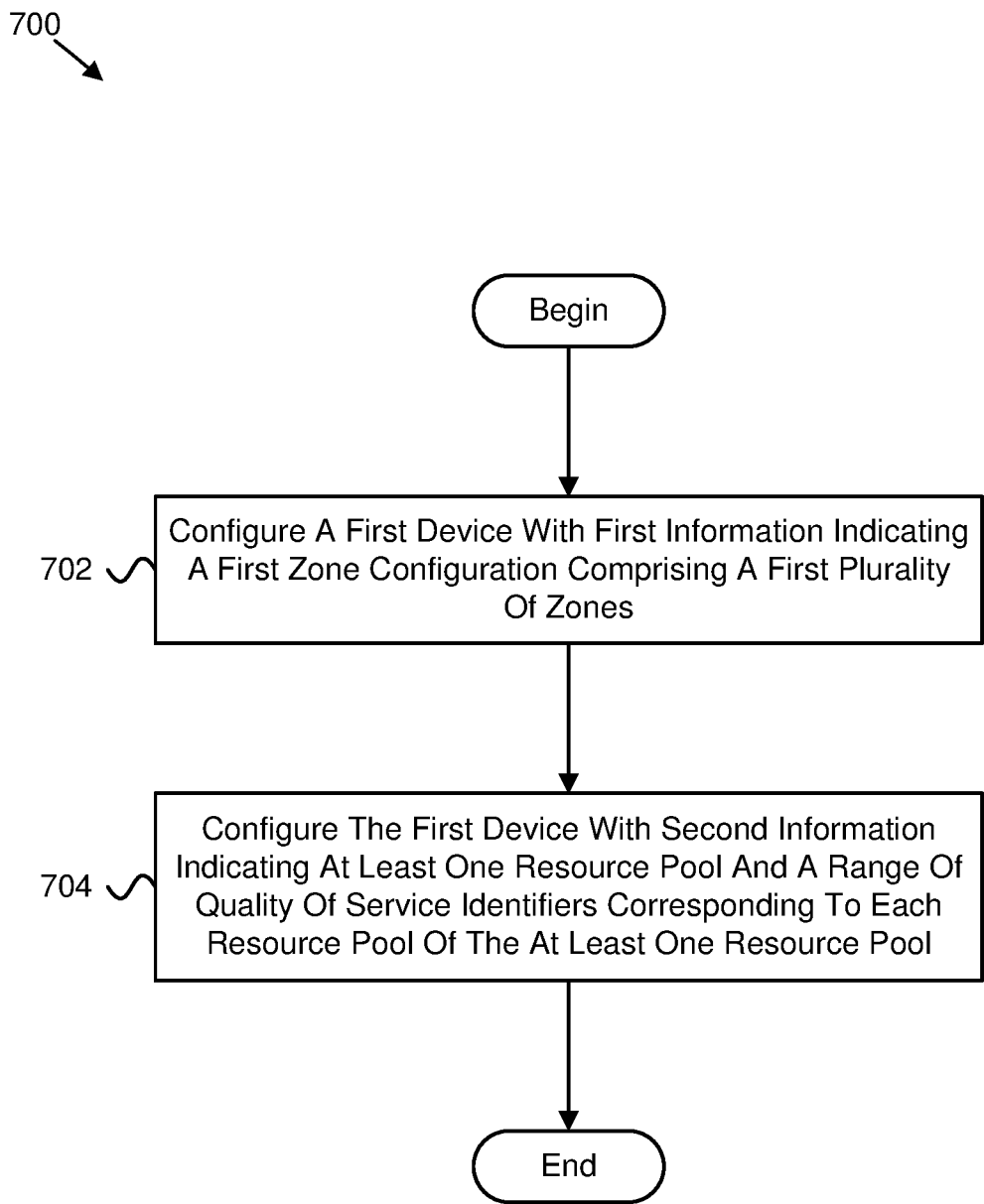
FIG. 7 is a flow chart diagram illustrating another embodiment of a method for multiple zone configuration.

FIG. 7 is a flow chart diagram illustrating another embodiment of a method 700 for multiple zone configuration. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes configuring 702 a first device with first information indicating a first zone configuration comprising a first plurality of zones. In some embodiments, the method 700 includes configuring 704 the first device with second information indicating at least one resource pool and a range of quality of service identifiers corresponding to each resource pool of the at least one resource pool.

In certain embodiments, the method 700 further comprises selecting a resource pool of the at least one resource pool for transmitting a message based on a quality of service identifier corresponding to the message.

In one embodiment, a method comprises: configuring a first device with first information indicating a first zone configuration comprising a first plurality of zones; and configuring the first device with second information indicating a second zone configuration comprising a second plurality of zones, wherein: a first area corresponding to zones of the first plurality of zones is smaller than a second area corresponding to zones of the second plurality of zones; and the first plurality of zones corresponds to a same geographical area as the second plurality of zones.

In certain embodiments, the first zone configuration is used to determine a distance between the first device and a second device.

In some embodiments, the first zone configuration is used to configure sidelink feedback.

In various embodiments, the second zone configuration is used to allocate resources for vehicle-to-everything communication.

In one embodiment, each zone of the second plurality of zones is assigned a set of resources.

In certain embodiments, the method further comprises receiving third information indicating whether a vehicle-to-everything communication corresponding to a zone of the second plurality of zones is enabled without performing a sensing operation.

In some embodiments, the method further comprises receiving the first information using radio resource control signaling.

In various embodiments, the method further comprises receiving the second information using radio resource control signaling.

In one embodiment, the second area corresponding to zones of the second plurality of zones corresponds to a speed related to the first device.

In certain embodiments, zones of the first plurality of zones are square shaped, rectangular shaped, hexagonally shaped, octagonally shaped, or circular.

In some embodiments, the method further comprises determining a distance between the first device and a second device based on a geometric center of a zone of the first plurality of zones corresponding to the second device and a geographical position of the first device.

In various embodiments, the method further comprises receiving a zone identifier corresponding to a second device in sidelink control information.

In one embodiment, the method further comprises determining a distance between the first device and the second device using the zone identifier.

In certain embodiments, the method further comprises determining a distance between the first device and a second device based on geographical location corresponding to the first device and the second device.

In some embodiments, the method further comprises determining a minimum communication range corresponding to a second device.

In various embodiments, the minimum communication range is determined based on an association between the minimum communication range and a group destination identifier corresponding to a received data packet.

In one embodiment, the minimum communication range is determined based on a received index value, and a mapping table comprises a mapping between a plurality of index values comprising the received index value and a plurality of minimum communication ranges comprising the minimum communication range.

In certain embodiments, the method further comprises receiving an indication of the minimum communication range in upper layer signaling.

In some embodiments, the second zone configuration comprises information indicating dedicated resource pools for sending feedback.

In various embodiments, the method further comprises reserving feedback resources based on a number of devices in a device group.

In one embodiment, reserving the feedback resources comprises performing a sensing procedure and reserving the feedback resources for group member devices determined from the sensing procedure.

In certain embodiments, the second information indicates specific geographic locations having a configuration different from the second zone configuration.

In one embodiment, an apparatus comprises: a processor that: configures a first device with first information indicating a first zone configuration comprising a first plurality of zones; and configures the first device with second information indicating a second zone configuration comprising a second plurality of zones, wherein: a first area corresponding to zones of the first plurality of zones is smaller than a second area corresponding to zones of the second plurality of zones; and the first plurality of zones corresponds to a same geographical area as the second plurality of zones.

In certain embodiments, the first zone configuration is used to determine a distance between the first device and a second device.

In some embodiments, the first zone configuration is used to configure sidelink feedback.

In various embodiments, the second zone configuration is used to allocate resources for vehicle-to-everything communication.

In one embodiment, each zone of the second plurality of zones is assigned a set of resources.

In certain embodiments, the apparatus further comprising a receiver that receives third information indicating whether a vehicle-to-everything communication corresponding to a zone of the second plurality of zones is enabled without performing a sensing operation.

In some embodiments, the apparatus further comprises a receiver that receives the first information using radio resource control signaling.

In various embodiments, the apparatus further comprises a receiver that receives the second information using radio resource control signaling.

In one embodiment, the second area corresponding to zones of the second plurality of zones corresponds to a speed related to the first device.

In certain embodiments, zones of the first plurality of zones are square shaped, rectangular shaped, hexagonally shaped, octagonally shaped, or circular.

In some embodiments, the processor determines a distance between the first device and a second device based on a geometric center of a zone of the first plurality of zones corresponding to the second device and a geographical position of the first device.

In various embodiments, the apparatus further comprises a receiver that receives a zone identifier corresponding to a second device in sidelink control information.

In one embodiment, the processor determines a distance between the first device and the second device using the zone identifier.

In certain embodiments, the processor determines a distance between the first device and a second device based on geographical location corresponding to the first device and the second device.

In some embodiments, the processor determines a minimum communication range corresponding to a second device.

In various embodiments, the minimum communication range is determined based on an association between the minimum communication range and a group destination identifier corresponding to a received data packet.

In one embodiment, the minimum communication range is determined based on a received index value, and a mapping table comprises a mapping between a plurality of index values comprising the received index value and a plurality of minimum communication ranges comprising the minimum communication range.

In certain embodiments, the apparatus further comprises a receiver that receives an indication of the minimum communication range in upper layer signaling.

In some embodiments, the second zone configuration comprises information indicating dedicated resource pools for sending feedback.

In various embodiments, the processor reserves feedback resources based on a number of devices in a device group.

In one embodiment, reserving the feedback resources comprises performing a sensing procedure and reserving the feedback resources for group member devices determined from the sensing procedure.

In certain embodiments, the second information indicates specific geographic locations having a configuration different from the second zone configuration.

In one embodiment, a method comprises: configuring a first device with first information indicating a first zone configuration comprising a first plurality of zones; and configuring the first device with second information indicating at least one resource pool and a range of quality of service identifiers corresponding to each resource pool of the at least one resource pool.

In certain embodiments, the method further comprises selecting a resource pool of the at least one resource pool for transmitting a message based on a quality of service identifier corresponding to the message.

In one embodiment, an apparatus comprises: a processor that: configures a first device with first information indicating a first zone configuration comprising a first plurality of zones; and configures the first device with second information indicating at least one resource pool and a range of quality of service identifiers corresponding to each resource pool of the at least one resource pool.

In certain embodiments, the processor selects a resource pool of the at least one resource pool for transmitting a message based on a quality of service identifier corresponding to the message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
configuring a first device with first information indicating a first zone configuration comprising a first plurality of zones;
configuring the first device with second information indicating a second zone configuration comprising a second plurality of zones, wherein:
a first area corresponding to each zone of the first plurality of zones is smaller than a second area corresponding to each zone of the second plurality of zones; and
the first plurality of zones corresponds to a same geographical area as the second plurality of zones; and
receiving third information indicating whether a vehicle-to-everything communication corresponding to a zone of the second plurality of zones is enabled without performing a sensing operation.

2. The method of claim 1, wherein the first zone configuration is used to determine a distance between the first device and a second device.

3. The method of claim 1, further comprising determining a distance between the first device and a second device based on a geometric center of a zone of the first plurality of zones corresponding to the second device and a geographical position of the first device.

4. The method of claim 1, further comprising receiving a zone identifier corresponding to a second device in sidelink control information.

5. The method of claim 4, further comprising determining a distance between the first device and the second device using the zone identifier.

6. The method of claim 1, further comprising determining a distance between the first device and a second device based on geographical location corresponding to the first device and the second device.

7. The method of claim 1, further comprising determining a minimum communication range corresponding to a second device.

8. The method of claim 7, wherein the minimum communication range is determined based on a received index value, and a mapping table comprises a mapping between a plurality of index values comprising the received index value and a plurality of minimum communication ranges comprising the minimum communication range.

9. The method of claim 7, further comprising receiving an indication of the minimum communication range in upper layer signaling.

10. The method of claim 1, wherein the second zone configuration comprises information indicating dedicated resource pools for sending feedback.

11. The method of claim 1, wherein the second information indicates specific geographic locations having a configuration different from the second zone configuration.

12. An apparatus comprising:
a processor that:
configures a first device with first information indicating a first zone configuration comprising a first plurality of zones; and
configures the first device with second information indicating a second zone configuration comprising a second plurality of zones, wherein:
a first area corresponding to each zone of the first plurality of zones is smaller than a second area corresponding to each zone of the second plurality of zones; and the first plurality of zones corresponds to a same geographical area as the second plurality of zones; and a receiver that receives third information indicating whether a vehicle-to-everything communication corresponding to a zone of the second plurality of zones is enabled without performing a sensing operation.

13. The apparatus of claim 12, wherein the first zone configuration is used to determine a distance between the first device and a second device.

* * * * *